M. V. LIDDELL.
MOTOR DRIVEN PICK-UP SWEEPER.
APPLICATION FILED JULY 24, 1918.
1,416,041. Patented May 16, 1922.
7 SHEETS—SHEET 1.
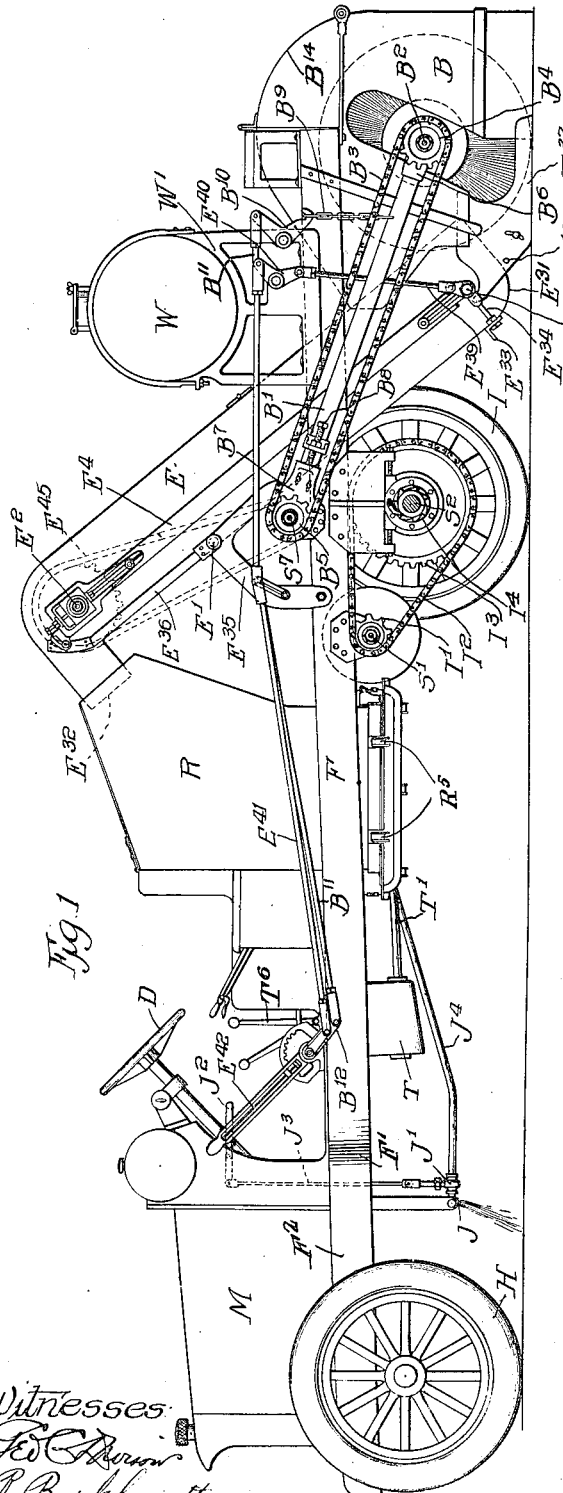
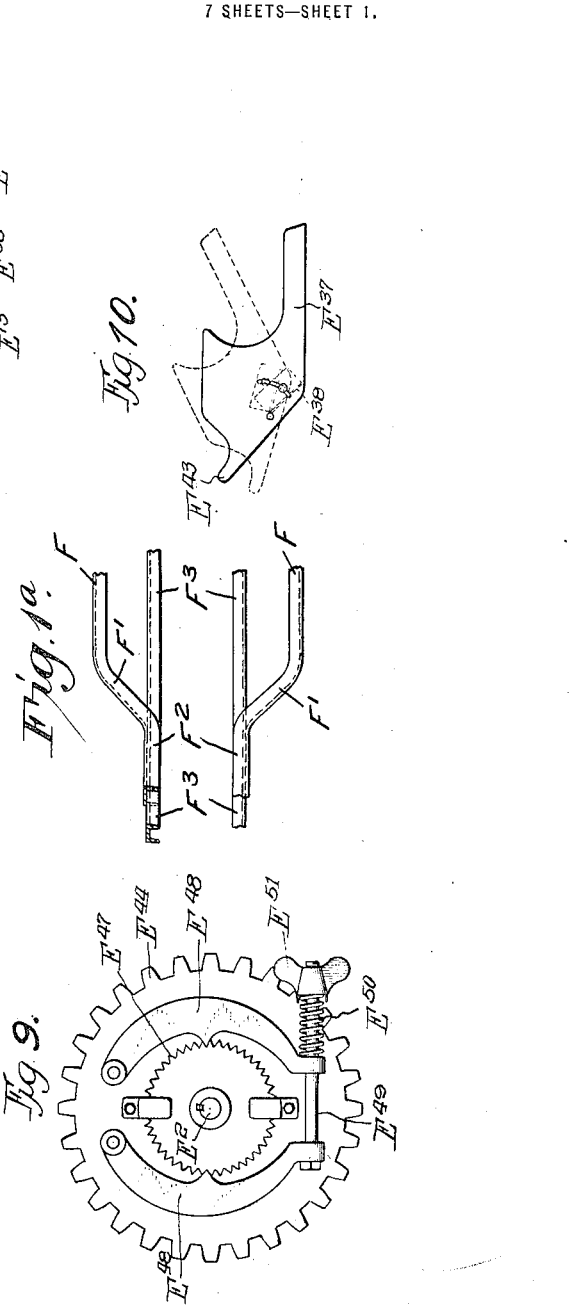
Witnesses
Inventor
M. V. Liddell

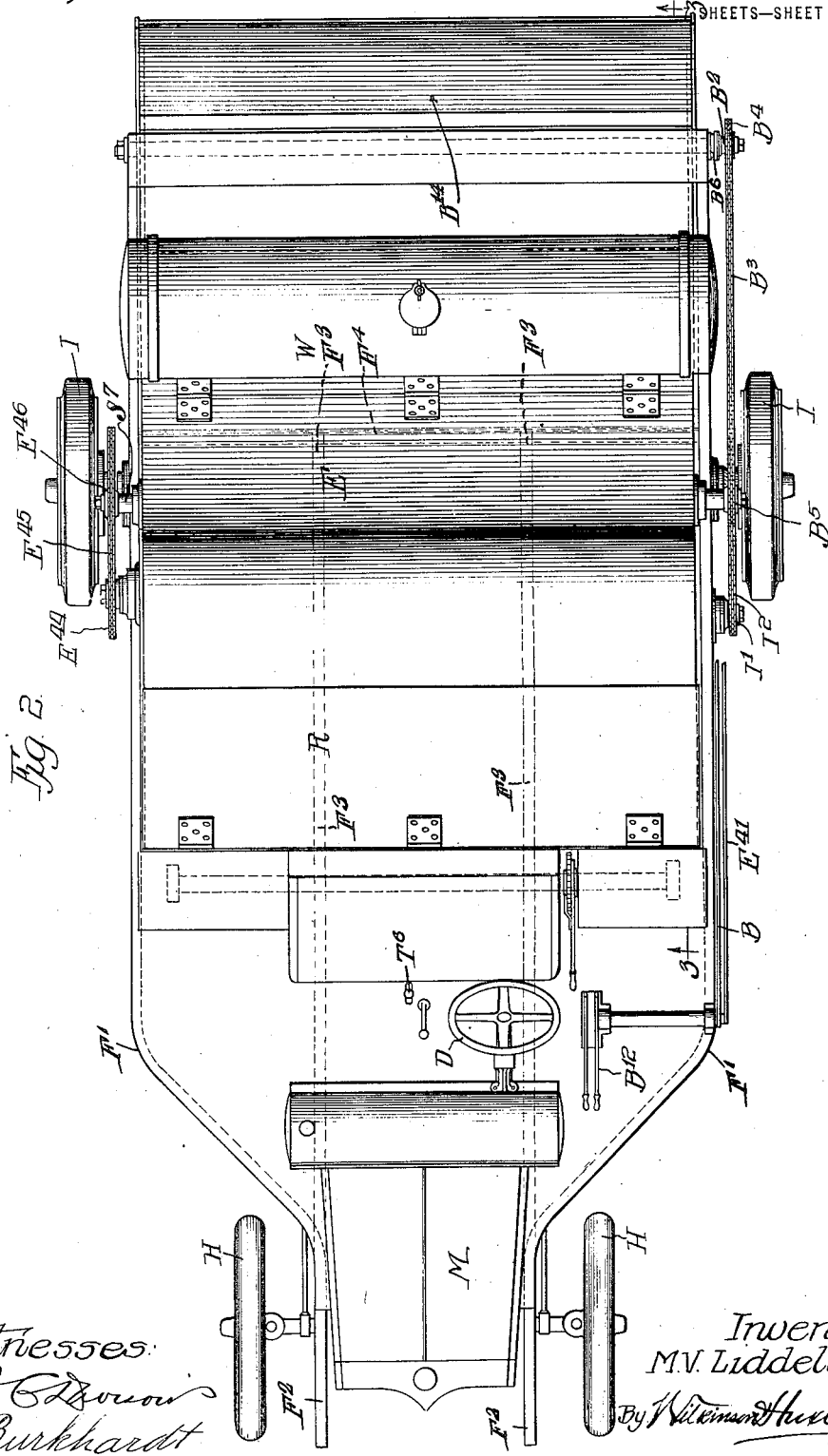

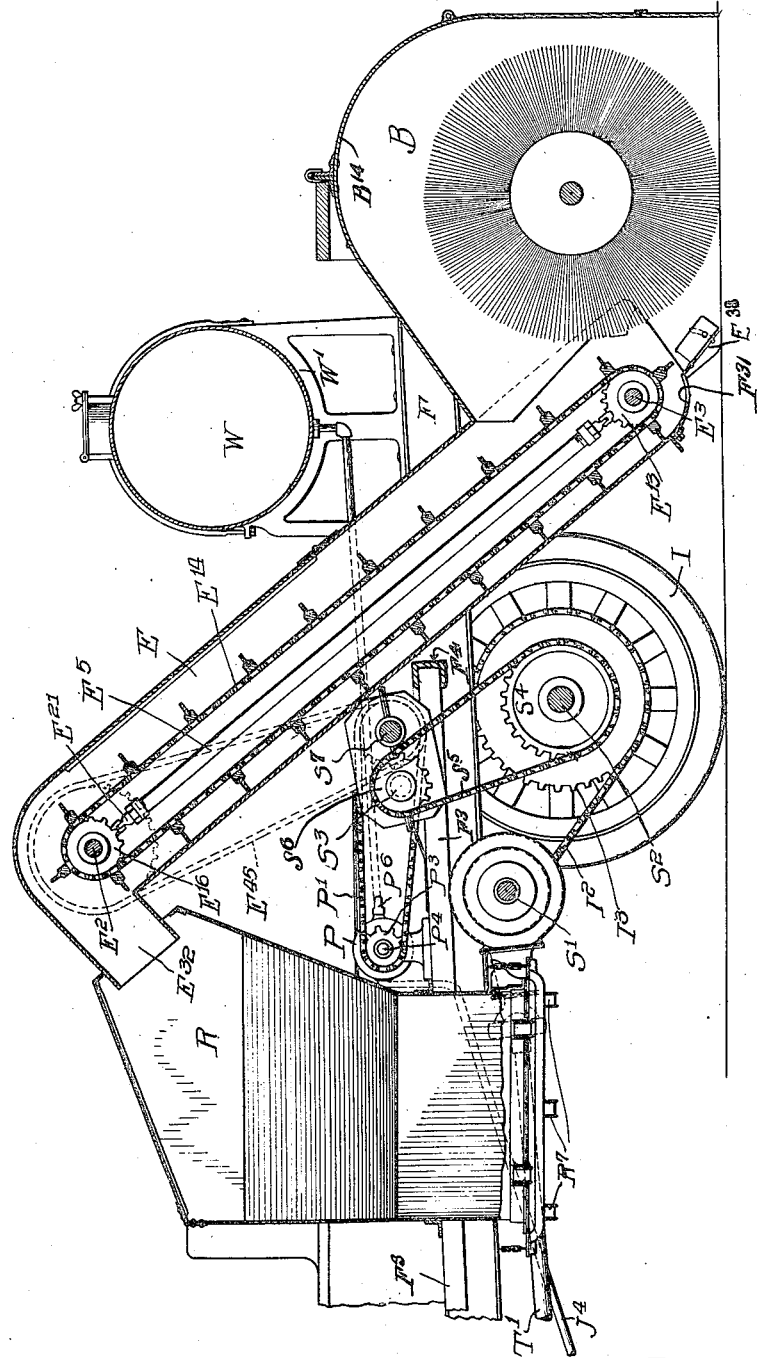

M. V. LIDDELL.
MOTOR DRIVEN PICK-UP SWEEPER.
APPLICATION FILED JULY 24, 1918.
1,416,041.
Patented May 16, 1922
7 SHEETS—SHEET 4.
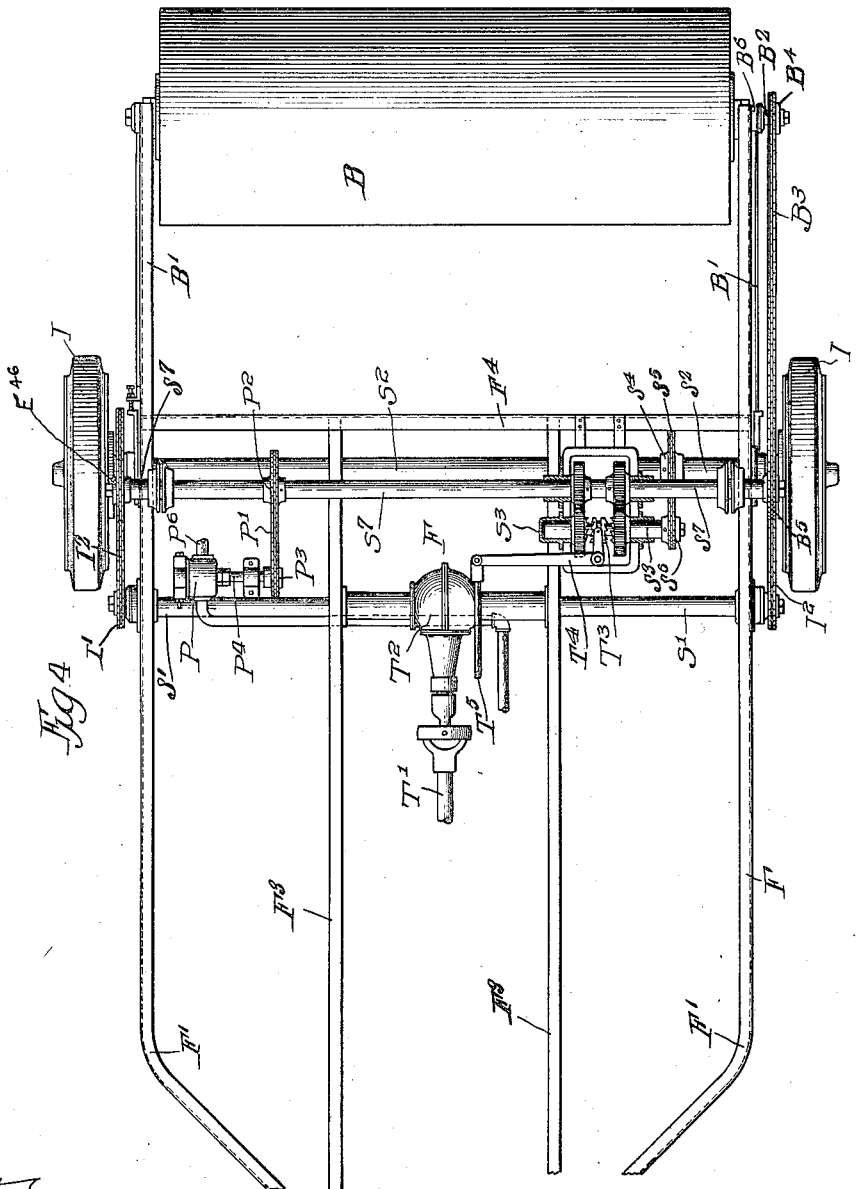

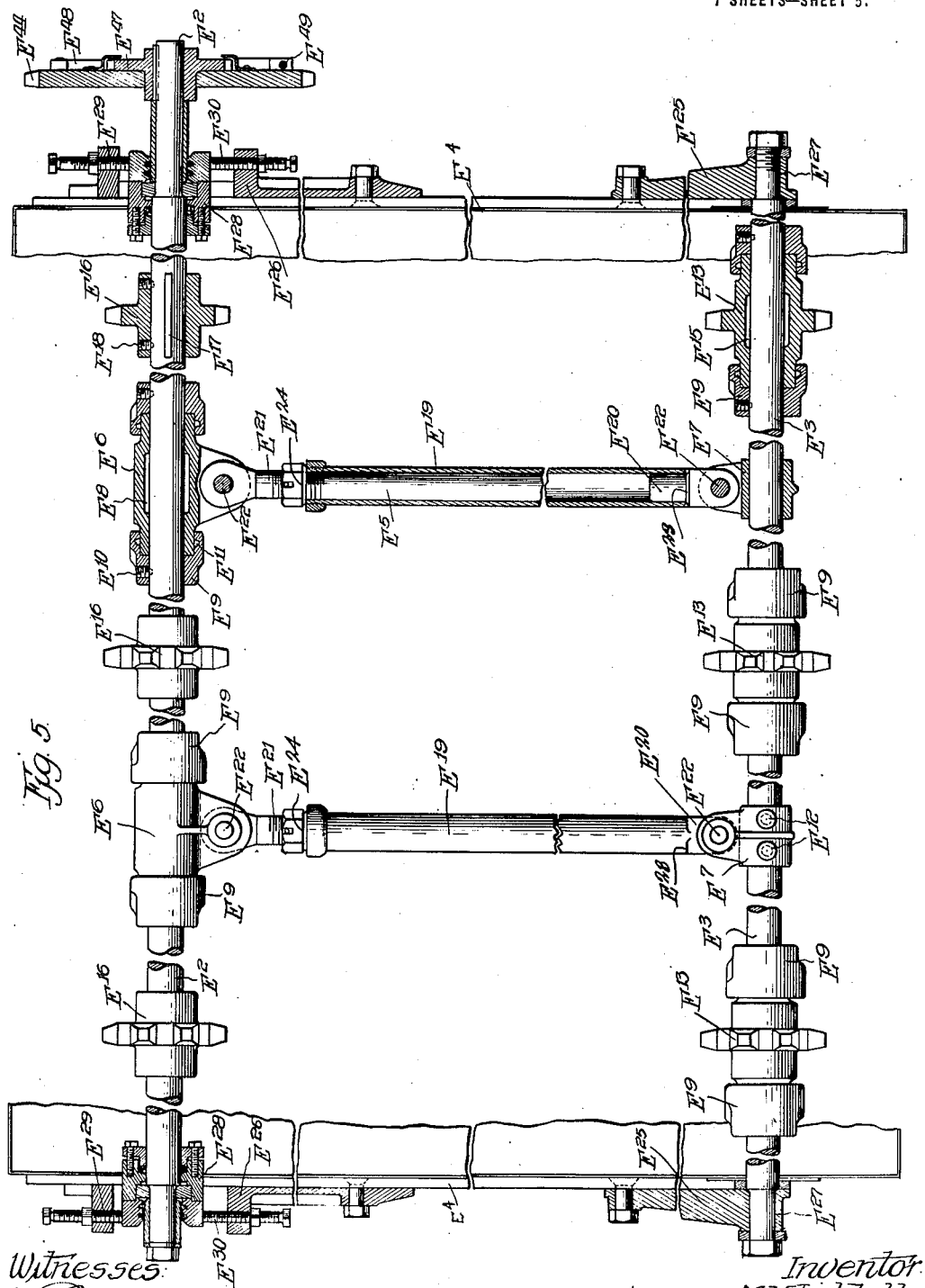

M. V. LIDDELL.
MOTOR DRIVEN PICK-UP SWEEPER.
APPLICATION FILED JULY 24, 1918.
1,416,041.
Patented May 16, 1922.
7 SHEETS—SHEET 6.
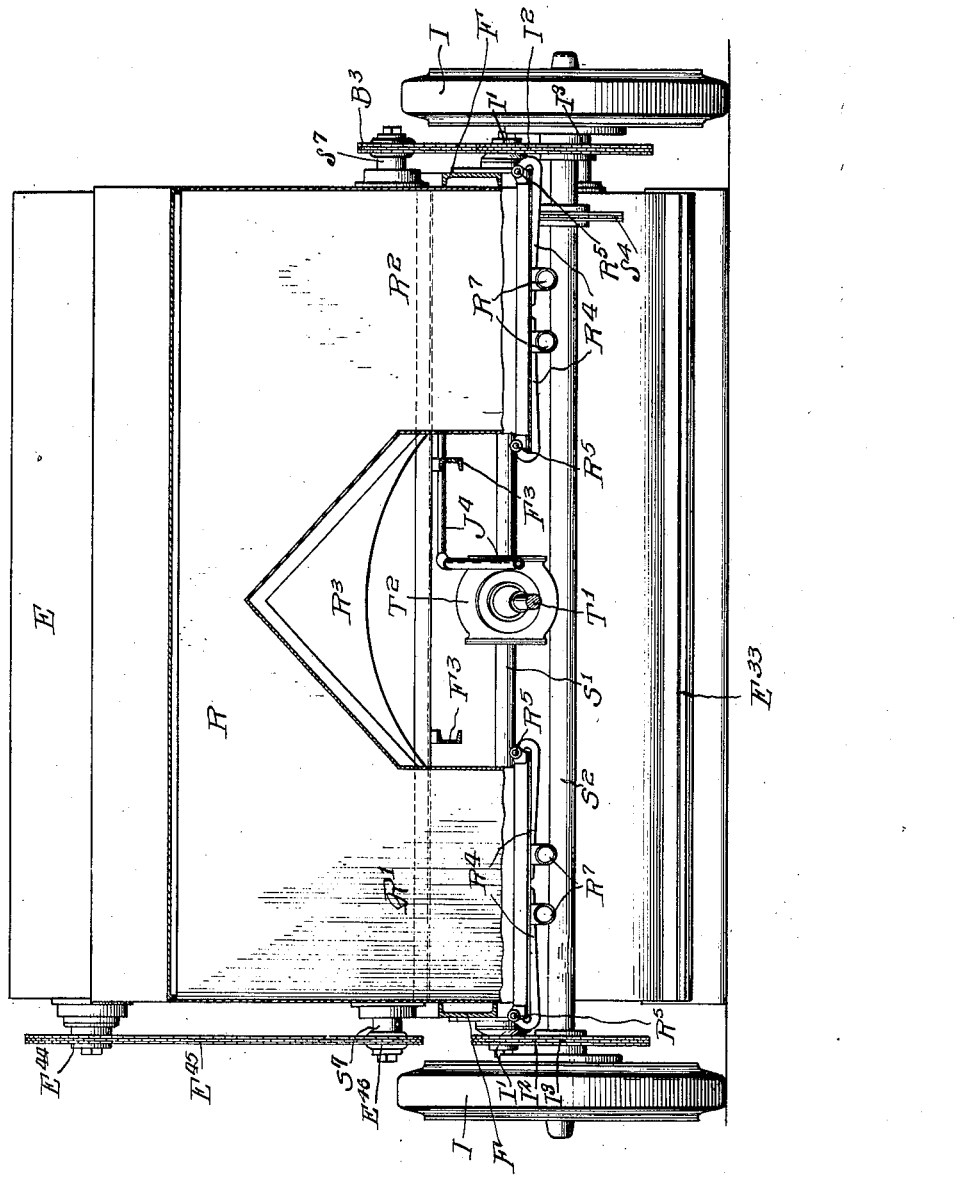

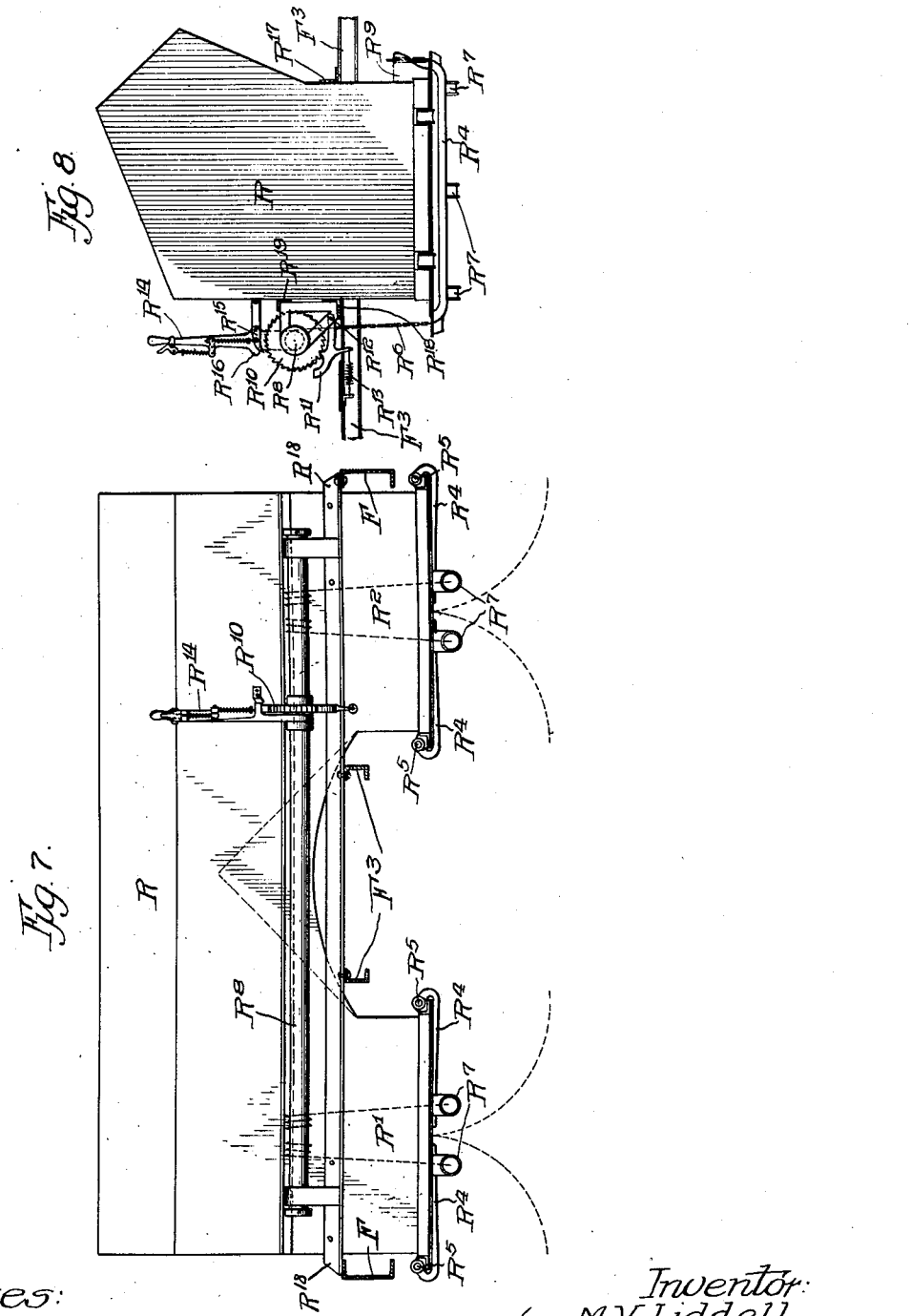

UNITED STATES PATENT OFFICE.

MOSES VOLNEY LIDDELL, OF HARVEY, ILLINOIS, ASSIGNOR TO AUSTIN MANUFACTURING CO., OF CHICAGO, ILLINOIS, A CORPORATION OF ILLINOIS.

MOTOR-DRIVEN PICK-UP SWEEPER.

1,416,041.        Specification of Letters Patent.     Patented May 16, 1922.

Application filed July 24, 1918. Serial No. 246,437.

*To all whom it may concern:*

Be it known that I, MOSES VOLNEY LIDDELL, a citizen of the United States, residing at Harvey, in the county of Cook and State of Illinois, have invented certain new and useful Improvements in Motor-Driven Pick-Up Sweepers, of which the following is a specification.

This invention relates to street sweeping machines of the type in which the sweepings are delivered by the broom to an elevator and by the latter delivered to a receptacle in which they may be collected until conveyed to a suitable place of discharge; and particularly to a machine for performing these functions, which is embodied in a motor-driven vehicle.

The object of the invention is to provide mechanism of simple and substantial design which will perform the functions above named in an efficient manner even when operated at relatively high speeds and will properly relate the functioning of such mechanism to the forward progression of the machine and therefore, to the area covered; also to so mount such mechanism upon the vehicle that the load will be imposed mainly upon and distributed in front and rear of the rear axle of the vehicle, leaving the forward part of the vehicle for the mounting of the propelling motor and the various elements of control required for the motor and for the functioning mechanisms of the machine; and finally to construct the vehicle in a manner that will better adapt it for mounting and correlating the several functioning mechanisms and delivering to them the driving power which they need.

In order that the invention may be fully understood, the principles governing the general organization of the machine as well as the organization of the several mechanisms of which it is composed, will now be pointed out, and the details of construction of a machine embodying the various features of the invention, and here selected for purposes of illustration, will be specifically described, reference being had to the accompanying drawings, in which—

Fig. 1 is a side elevation of the complete machine;

Fig. 1ª is a detail view of forward ends of the inner and outer frames.

Fig. 2 is a plan view of the same.

Fig. 3 is a vertical section on the line 3—3 of Fig. 2, showing the rear portion of the machine and the several parts thereof which enter into the sprinkling, sweeping and collecting functions thereof;

Fig. 4 is a plan view of the rear portion of the machine with the elevator and other mechanisms which project above the plane of the frame, removed;

Fig. 5 is a detail view of the elevator frame;

Fig. 6 is a vertical transverse section in the plane of the sweepings receptacle, and looking toward the rear;

Figs. 7 and 8 are respectively a front elevation and a side elevation of the sweepings receptacle together with the mechanism for simultaneous control of its two pairs of dump doors;

Fig. 9 is a detail view of the automatically releasing connection between the upper elevator shaft and the sprocket which drives the same;

Fig. 10 is a detail view of one of the curb shoes which confine the sweepings at the ends of the broom.

*General arrangement.*—The apparatus comprises a suitable frame or chassis F, mounted upon front wheels H through which the vehicle is steered in travel, and rear wheels, I, which serve the threefold purpose of sustaining the main load of the machine, propelling the machine and imparting drive to the several mechanisms which perform its various functions; a standard type of motor housing M with steering wheel D and other elements of motor control mounted upon the forward part of the frame; standard selective transmission, T, and drive shaft T' extending rearwardly therefrom for propelling the vehicle; and receptacle R, elevator E, water supply W with its pump P, and rotary broom B, mounted upon the rear portion of the machine, together with the various mountings for these parts and their driving connections.

*Driving connections.*—The driving connections consist primarily of the power shaft $S^1$ connected by the differential drive $T^2$ with the shaft $T^1$ and having constant driving connections through sprockets $I^1$, chains $I^2$, and sprockets $I^3$ with the rear wheels; the main drive shaft or axle $S^2$, upon which are rotatively mounted the rear wheels I, but which is driven by said wheels through forward driving ratchets $I^4$ whenever either wheel travels in a forward direction; stub shaft $S^3$ (Figs. 3 and 4) receiving constant drive from main shaft $S^2$ through the medium of sprocket $S^4$, chain $S^5$, and sprocket $S^6$, whenever the machine moves forward; and the counter shaft $S^7$ adapted to be connected at will with the stub shaft $S^3$ through the medium of the stopping, starting and speed changing gear $T^3$ which is under control of shift lever $T^4$, rod $T^5$ (Fig. 4) and hand lever $T^6$ (Fig. 1) near the driver's seat; said counter shaft having at its ends sprockets $B^5$ and $E^{46}$ for driving the broom and the elevator respectively and at an intermediate point, a sprocket $P^2$ for driving the pump as hereinafter described.

An important feature of the present invention resides in the subdivision of the drive connections as above described, into a propulsion drive with its stopping, starting and speed changing elements controlling the locomotion of the machine and a functioning drive, or drive imparted to the functioning mechanisms, such as broom, elevator and pump, which results only from forward progress of the machine over the surface, which is continuous so far as the stub shaft is concerned, and extends beyond the stub shaft only at the will of the operator and then at a selected speed, and which, whenever transmitted beyond the stub shaft, is delivered to all of the sub-mechanisms or functioning mechanisms so that there is necessarily simultaneous and properly related functioning of these co-ordinated mechanisms which go to make up the the functioning portion of the machine.

In order to distribute the load of these several mechanisms mainly over the rear axle, the receptacle R is mounted between the front and rear axles; the elevator E is provided with trunnions $E^1$ at a point intermediate of its ends, on its underside, and near the rear axles $S^2$ so that the elevator lies above and across the rear axle, with its length extending downwardly and rearwardly to a point near the ground so that its upper end delivers forward of the main axle and into the receptacle while its rear end is well to the rear of the main axle; the water receptacle W is mounted upon the frame in rear of the elevator E with its cradles $W^1$ resting upon the side rails F astride of the elevator and leaving space for the latter to rise between them; and the mountings for the broom, comprising arms $B^1$ extend from the counter shaft $S^4$ located slightly forward of the rear axle to a plane below the rear end of the frame, in order to present the broom just beyond the rear lower end of the elevator, while sustaining the broom in a manner to minimize the transmission of vibration from the vehicle to the broom, and maintain proper relation between the broom and elevator, as the broom wears down in diameter, all as hereinafter explained in the detailed description of these several mechanisms.

An important advantage arising out of the described distribution and relations of the several functioning mechanisms, and particularly the housings therefor is that the receptacle R, elevator housing E, and hood $B^{14}$ of the broom B, afford a continuous roofing from front to rear, the position of the elevator housing, E, that extends between the receptacle and the broom-hood, affording an ample protected space beneath it, over the main axle and transverse beam, and forward thereof to receive operative parts such as the pump with its by-pass valve and its driving and circulating connections, the counter-shaft and stub-shaft with the differential clutch between them, and the differential wheel drive and its shaft, while the tunnel or arch through the receptacle, afforded by its double hopper bottom to be described, affords access to such space for such parts as the auxiliary frame rails, the clutch rods, etc.

*The frame.*—In order to afford proper support for the parts distributed as above described, to insure a rigid but light frame by which to bridge the extended wheel base, to provide an extended overhang at the rear to support the water tank and receive the lifting connections for the elevator and broom, and finally to adapt the frame to receive the axle of the front steering wheels of standard track gauge and the axle of the rear main support and driving wheels having a track gauge increased to provide the necessary width of sweeping path, I have provided a special construction of frame the essential features of which are as follows:

A main frame comprising longitudinally extending side rails F, spaced apart to afford the necessary width to accommodate the axial dimension of the broom and the corresponding width of elevator between them, and converging at $F^1$ to reduce the distance between their front ends and provide parallel forward ends $F^2$ that rest upon the axle of the forward steering wheels H and at the same time afford the necessary sills for mounting the power plant M; also an auxiliary frame comprising parallel longitudinal rails $F^3$ of smaller dimensions than the rails F, secured at their forward ends to and lying in the channels of the forward parallel ends $F^2$ of the main frame and extending rearwardly therefrom; and a cross beam $F^4$ spacing the rear portions of the main side rails F apart, and receiving the rear ends of the auxiliary frame members $F^3$; said cross beams securely uniting the several longitudinal rails of the main and auxiliary frames immediately in rear of the main axle. The auxiliary frame members assist in transmitting longitudinal thrust and lend lateral stiffness to the entire frame. Preferably the longitudinal rails are channel construction, the channels of the side rails being presented inwardly and the overlapping portions of the main and auxiliary frame rails being received one within the channel of the other at the front end.

From the foregoing it will be seen that the rearwardly presented ends of the main side rails, and the transverse beam immediately forward of the elevator afford a well defined and rigid berth for the elevator which lies between and is protected by said rails, and mountings for the lifting connections through which the elevator and broom are raised from the ground when out of action. The location of the elevator fulcrums well below its upper end, reduces the arc through which its lower end swings, avoids interference with the broom in raising it, and reduces the labor required for manipulating its controlling lever.

*Water supply.*—The water is supplied to the surface through a downwardly delivering jet pipe J under a head of pressure developed by the pump P of sufficient force to produce not merely a moistening effect upon the material to be swept up, but a penetrating and loosening effect upon the dirt; that is to say a purely mechanical effect due to the force of the spray. In other words, the sprinkling function is developed in the form of a needle bath. The discharge of the spray is controlled by a valve $J^1$ and its handle $J^2$ with connecting rod $J^3$, water being delivered at the valve J under a constant head of pressure, through a pipe $J^4$ leading from the pump P and said pump being constantly driven through a chain $P^1$ connecting the sprocket $P^2$ on the counter shaft $S^4$ with sprocket $P^3$ on pump shaft $P^4$. The circulating connections from the water supply through this pipe can follow the well-known plan of by-passing water back to the source of supply whenever the resistance at the outlet becomes excessive, as, for instance, by shutting off the surface spray.

From the foregoing it will be seen that the supply of moisture to the surface to be swept may be controlled at will by the mere manipulation of the spray valve lever $J^2$. It will also be seen that the spray J is located at the forward end of the machine and therefore so remote from the broom that time is afforded for the moisture to penetrate the material to be swept up before it is reached by the broom.

*Sweepings receptacle.*—The sweepings receptacle R is provided with a double hopper bottom $R^1$, $R^2$, (Figs. 6 and 7) in a manner to leave a central tunnel or archway $R^3$ through which to pass the water supply pipe $J^4$ and such other connections as may be desired and also to admit the supplemental frame $F^3$. In the embodiment here shown the hoppers $R^1$, $R^2$, are closed at bottom by the pairs of twin doors $R^4$ but obviously a sack, barrel or other removable receptacle might be applied to each hopper in a manner well known in this art. The doors $R^4$ are hinged at $R^5$ and are controlled by chains $R^6$ passing through the thimbles $R^7$ beneath the doors and having their free ends so wound upon the shaft $R^8$ that the doors may be drawn tightly to their seats beneath the hoppers $R^1$, $R^2$, whenever the chains are wound up upon the shaft, or they will be permitted to drop away from the hoppers and deposit the contents of the latter whenever the winding shaft $R^8$ is released so that the chains may unwind. To bring each pair of doors under the control of the chain with compensation so that both doors will be closed tightly although one door may reach its seat in advance of the other, each chain is doubled upon itself and has its middle portion anchored upon a bracket $R^9$ at the rear of the receptacle, the free ends of the chain $R^6$ being attached to the winding shaft $R^8$ in each instance. Thus the portion of the chain beneath either door may yield if the door engaged by the other portion should first come to a seating and thus permit the winding action to continue until both doors are tightly closed. In order to compensate for stretching or wear in the chains of the respective pairs of doors, the brackets $R^9$ may be made 10 adjustable vertically so that both pairs of doors will attain the closed position simultaneously. In order to control the winding shaft $R^8$ it is provided with a ratchet wheel $R^{10}$ normally held against unwinding by a dog $R^{11}$ having spring $R^{13}$, and pivoted at $R^{12}$ while a lever $R^{14}$ fulcrumed upon shaft $R^8$ and carrying a hand controlled pawl $R^{15}$, is adapted by its normal oscillatory movement, to rotate the ratchet 11 $R^{10}$ and shaft $R^8$ to wind up the chains, but has a toe $R^{16}$ that encounters and unseats the dog $R^{11}$ whenever said lever is thrown down beyond its normal range of winding movement, thereby releasing the winding 11 shaft and permitting the chains to unwind and the doors to drop and discharge the material within the hoppers. These features are not claimed herein, but are embodied in a divisional application. 12(

*The elevator.*—The elevator E is of the type having endless chains that carry crossbars with flexible tongues or blades scraping upon the surface of the trunk or casing and so advancing the material to the point of 125 delivery. Its essential features are the upper and lower shafts $E^2$, $E^3$, securely framed in the spreader bars $E^4$ having bearings that receive the ends of the shafts and the struts $E^5$ distributed at intermediate points and 13( provided with wrist couplings $E^6$, $E^7$, through which the shafts extend. Wrist couplings $E^6$ are especially constructed to permit rotation of the upper shaft $E^2$ therein, being provided with lubricant pockets $E^8$, and being confined between collars $E^9$ that are fixed by set-screws $E^{10}$ upon the shaft $E^2$ in position to enclose the ends of the wrist couplings and resist the escape of the lubricant. Packings $E^{11}$, interposed between overlapping portions of the wrist couplings and collars assist in confining the lubricant. The lower shaft $E^3$ is not rotatable and accordingly its wrist couplings $E^7$ are fixed thereon by pins $E^{12}$, and the lower sprockets $E^{13}$ for the elevator chains, $E^{14}$, are made rotatable, and provided with the lubricant spaces $E^{15}$ being confined by collars $E^9$ similar to those which confine the wrist bearings on the upper shaft. The sprockets that receive the chains $E^{14}$ upon the upper shaft, $E^2$, are indicated at $E^{16}$ and these being necessarily driven by the shaft $E^2$, are secured against rotation thereon by the keys $E^{17}$ and held against axial displacement by set screws $E^{18}$. In this manner, as the upper shaft rotates in its bearings in the side rods and spreading struts, it drives the spockets mounted thereon and the chains engaged by these sprockets while the lower shaft is fixed against rotation in the side rods and in the wrist bearings of the spreading struts, but permits the lower sprockets to rotate upon it.

In order to keep the chains taut in the elevator, each strut $E^5$ comprises a tubular member $E^{19}$ that receives the shanks $E^{20}$, $E^{21}$, of the wrist bearings $E^6$, $E^7$, and abut against shoulders $E^{23}$, $E^{24}$ thereon, and one of these shoulders, for instance the upper shoulder $E^{24}$, is threaded for adjustment upon its shank $E^{21}$ in order to change the length of the strut. Shanks $E^{20}$, $E^{21}$, are connected to their respective bearing members by means of knuckle joints $E^{22}$ in order to avoid binding the bearings $E^6$ upon the shaft $E^2$ under relative end movements of the shafts.

The side bar $E^4$ carries hangers $E^{25}$ and $E^{26}$ at its lower and upper ends respectively of which the hanger $E^{25}$ is provided with a seat $E^{27}$ in which the reduced end of the lower shaft $E^3$ is firmly secured, while the upper hanger $E^{26}$ is formed with a yoke that receives a journal bearing $E^{28}$ for the upper shaft $E^2$, which bearing is adjustable in the longitudinal direction of the elevator, through means of the upper and lower set screws $E^{29}$, $E^{30}$. The adjustment of the bearing $E^{28}$ compensates for changes in the length of the chain in the same manner as does the adjustment of the length of the intermediate struts.

The elevator further comprises a trunk E which is constructed with a trough $E^{31}$ at bottom substantially concentric with lower shaft $E^3$ and with a spout $E^{32}$ at top which delivers into the receptacle R. The trunk E is fixed relatively to the operating mechanism of the elevator by confining it laterally between the side bars $E^4$ and permitting it to rest at top upon the journal bearings $E^{28}$. At bottom it is supported by the angle bar $E^{33}$ suspended by links $E^{34}$ from the lower shaft $E^3$ and these links are made adjustable in order to determine the distance of the lower shaft $E^3$ from the trough $E^{31}$ and thereby insure contact of the elevator blades or scrapers with the bottom of the trough and trunk.

The trunk E carries the trunnions $E^1$ and these have their bearings in the yokes $E^{35}$ which are in turn secured to the side rails or channel beams of the main frame F, positioned to locate the load of the elevator forward of the axle $S^2$, and therefore, as will be seen from Figure 4, forward of the cross beam $F^4$ where the frame is better adapted to sustain side thrust while leaving the lower rear portion of the elevator depending into the unobstructed space between the rear extensions of the main rails. Yokes $E^{35}$ are spaced laterally outward from the sides of the trunk E and the trunnions are provided with upwardly and inwardly inclined stays $E^{36}$ that are secured to the upper portion of the trunk E in a manner to insure lateral stability thereof.

In order to direct the sweepings into the lower end of trough $E^{31}$, a pair of curb shoes $E^{37}$, located at the ends of the brush, are pivoted at $E^{38}$ on the lower end of the elevator, and extend rearwardly so as to prevent the sweepings being thrown outwardly. Between the shoes $E^{37}$ is located a baffle plate $E^{38}$ which hangs down from the rear edge of the trough $E^{31}$ and so prevents the sweepings being thrown beneath the trough. This baffle plate does not otherwise co-act with the broom, the delivery of the sweepings into the trough being by the throwing effect of the broom rather than by its scraping upward over the surface of the baffle. The curb shoes $E^{37}$ drag upon the ground and thus receive constant vibration, which, being transmitted to the baffle plate $E^{38}$, constantly dislodges any material that may be deposited upon the latter, so that such material again falls into the path of the broom, to be picked up and thrown over into the trough.

*Raising the elevator.*—In order to raise the lower end of the elevator and insure enough clearance to avoid injury during the travel to and from the field of operations, a lifting rod $E^{39}$ connects the lower axle $E^3$ with one end of the bell crank lever $E^{40}$, the other end of which is connected by rod $E^{41}$ with the lever $E^{42}$ located within reach of the driver's seat. A horn $E^{43}$ upon each curb shoe $E^{37}$, projects beneath the lower elevator shaft $E^3$, with sufficient space to leave the shoe free for vertical vibration in dragging over the ground, but in position to arrest downward movement of the shoe beyond its normal limit and so insure lifting of the shoe with the lower end of the elevator, whenever the latter is lifted for transport.

*Slip drive for elevator.*—It sometimes happens in the operation of sweepers of this general type, owing to an excessive accumulation of material upon the surface to be swept, that the broom delivers to the elevator more material than the latter can dispose of and chokes the elevator to such an extent that continued application of driving power to the latter would subject the parts to breakage. In order to avoid this danger, the sprocket $E^{44}$ which receives the chain $E^{45}$ from the sprocket $E^{46}$ on the shaft $S^4$, has a slip connection with the shaft $E^2$ which drives the elevator; said slip connection being developed through the medium of an obtuse tooth ratchet $E^{47}$ keyed to the shaft $E^2$ and a pair of slip-pawls $E^{48}$, mounted on the sprocket $E^{44}$, and held in yielding embrace upon the ratchet $E^{47}$ through the medium of the bolt $E^{49}$ and its adjusting nut $E^{51}$ acting through the spring $E^{50}$.

*The broom.*—The broom B is of cylindrical type, mounted between a pair of arms $B^1$ and driven through chain $B^3$ connecting the sprocket $B^4$ on its shaft $B^2$, with sprocket $B^5$ on the counter shaft $S^7$. Arms $B^1$ carry bearings $B^6$ at their lower ends for the shaft $B^2$, and are hung at their upper ends by the bearing-hangers $B^7$ which surround the counter shaft $S^7$. Said arms may be longitudinally adjusted with reference to their hangers $B^7$, by adjusting screws $B^8$, and so determine the relation of the broom to the elevator, and take up wear in the chain which drives the broom.

Special importance is attached to the location of the support $S^4$ for the arms $B^1$ of the broom, with reference to the point of contact between the broom and the ground, and also with reference to the main axle $S^2$. In the first place the angle at which the arms rest, and the length of these arms is such that they eliminate transmission of vertical vibration to the broom to the greatest possible degree and in the second place they direct the broom slightly toward the receiving end of the elevator as the splints of the broom wear down and the broom becomes of smaller diameter and of less flexibility, and compensate for its reduced capacity for throwing the sweepings into the trough $E^{31}$. These structural conditions are especially important when the point $S^4$ at which the arms are hung is above the main wheel and the driving sprocket, $B^5$, is connected to the main wheel, through flexible connections such as one or more chains, as employed herein, as has already been described. Where the arms of the broom are mounted directly upon the main axle and the sprocket through which the broom is rotated is geared directly to a sprocket on the propelling wheel, not only are the vertical vibrations of the wheel transmitted to the broom, but the inertia of the transmitting connections and consequent lack of freedom of the arms to swing relatively to the wheels greatly amplifies the vibration thus transmitted, with the result that the entire machine must be operated at reduced speed in order to keep the broom from jumping from the surface and leaving portions unswept.

In order to move the broom B vertically to and from sweeping position, arms $B^1$ are connected by chains $B^9$ with one end of a bell-crank lever $B^{10}$, the other end of which is connected by rod $B^{11}$ with the lever $B^{12}$ within reach of the driver of the machine.

I claim—

1. In a sweeping machine, inner and outer frames, each comprising longitudinal rails, a cross beam spacing the rear portions of said rails apart and leaving ends of the outer frame rails extending rearwardly beyond it, a sweepings receptacle mounted upon the forward portion of both frames, and an elevator mounted upon the rear portions thereof forward of the cross beam and extending rearwardly and downwardly into the space between the rear ends of the side rails and having its upper forward end in position to deliver to the sweepings receptacle.

2. In a sweeping machine, the combination of a frame having longitudinal main rails united by a cross beam at a point forward of their rear ends and leaving longitudinal portions projecting rearwardly beyond said cross beam, intermediate longitudinal rails extending forward from said cross beam, transmission connections mounted upon the frame forward of said cross beam, a sweepings receptacle mounted on the main frame and intermediate longitudinal rails of the frame forwardly from the transmission connections, and an elevator mounted upon the frame with its rear portion extending downwardly into the space between the rear portions of the main frame rails in rear of the cross beam and with its forward portion extending upwardly in position to deliver to the sweepings receptacle and overlying the main and intermediate rails and the transmission connections.

3. In a sweeping machine, combination of supporting and driving wheels, an elevator mounted upon the machine and having connections through which it receives a drive from said wheels, and a slip connection through which drive is imparted to the elevator comprising a ratchet wheel and a pair of pivoted pawls engaging said ratchet wheel and having means for yieldingly holding them in engagement therewith.

4. In combination with a sweeping machine, a sweepings receptacle, an inclined elevator trunk adapted to receive sweepings at its lower end and discharge them at its upper end into the sweepings receptacle, upper and lower elevator shafts, an endless flexible elevating means mounted on said shafts, a frame for said shafts comprising side bars carried by the trunk and in which the ends of the shafts are mounted with relative adjustment between them, and intermediate struts for spacing said shafts having wrist bearings in which said shafts turn and having means for adjusting them to determine the distance between the shafts; said intermediate struts having joints near their wrist bearings permitting flexing in the plane of the elevating means.

5. In combination with a sweeping machine, a sweepings receptacle, an inclined elevator trunk adapted to receive sweepings at its lower end and discharge them at its upper end into the sweepings receptacle, upper and lower elevator shafts, an endless flexible elevating means mounted on said shafts, a frame for said shafts comprising side bars carried by the trunk and in which the ends of the shafts are mounted with relative adjustment between them, and intermediate struts for spacing said shafts having wrist bearings in which said shafts turn and having means for adjusting them to determine the distance between the shafts; each of said struts comprising a tubular member, a shank carried by its wrist bearing and entering the end of said tubular means, and an adjustable shoulder against which the tubular member bears.

6. In an elevator for sweeping machine, curb shoes for confining the sweepings at the sides of the lower end of the elevator having pivotal connection therewith, means for raising the lower end of the elevator for transport and projections carried by the curb shoes adapted to engage the elevator to limit the pivotal movement of the curb shoe upon the elevator when the latter is raised.

Signed at Chicago, Illinois, this 16th day of July, 1918.

M. VOLNEY LIDDELL.